United States Patent
Chou

(10) Patent No.: US 8,209,499 B2
(45) Date of Patent: Jun. 26, 2012

(54) METHOD OF READ-SET AND WRITE-SET MANAGEMENT BY DISTINGUISHING BETWEEN SHARED AND NON-SHARED MEMORY REGIONS

(75) Inventor: Yuan C. Chou, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 350 days.

(21) Appl. No.: 12/688,234

(22) Filed: Jan. 15, 2010

(65) Prior Publication Data

US 2011/0179230 A1    Jul. 21, 2011

(51) Int. Cl.
*G06F 12/06* (2006.01)
(52) U.S. Cl. .................. 711/150; 711/E12.101
(58) Field of Classification Search .......... 711/150, 711/153, E12.101
See application file for complete search history.

(56) References Cited

U.S. PATENT DOCUMENTS

| 2008/0319997 | A1* | 12/2008 | Duffy et al. ............. 707/8 |
| 2009/0077329 | A1* | 3/2009 | Wood et al. ........... 711/156 |
| 2009/0177847 | A1* | 7/2009 | Ceze et al. ............ 711/152 |
| 2009/0235254 | A1* | 9/2009 | Michael ................. 718/101 |
| 2011/0029490 | A1* | 2/2011 | Agarwal et al. ....... 707/684 |
| 2011/0055483 | A1* | 3/2011 | Heller, Jr. ............. 711/125 |
| 2011/0099335 | A1* | 4/2011 | Scott et al. ........... 711/141 |

* cited by examiner

*Primary Examiner* — Hal Schnee
(74) *Attorney, Agent, or Firm* — Osha • Liang LLP

(57) ABSTRACT

A method of read-set and write-set management distinguishes between shared and non-shared memory regions. A shared memory region, used by a transactional memory application, which may be shared by one or more concurrent transactions is identified. A non-shared memory region, used by the transactional memory application, which is not shared by the one or more concurrent transactions is identified. A subset of a read-set and a write-set that access the shared memory region is checked for conflicts with the one or more concurrent transactions at a first granularity. A subset of the read-set and the write-set that access the non-shared memory region is checked for conflicts with the one or more concurrent transactions at a second granularity. The first granularity is finer than the second granularity.

23 Claims, 4 Drawing Sheets

METHOD OF READ-SET AND WRITE-SET MANAGEMENT BY DISTINGUISHING BETWEEN SHARED AND NON-SHARED MEMORY REGIONS

BACKGROUND OF INVENTION

The use of transactional memory is desirable from a programmer's perspective, but implementing hardware transactional memory can be taxing on conventional processors. To support the execution of concurrent transactions, a processor must track a large number of reads and writes performed by a given transaction. The reads performed by the transaction ("read-set") and the writes performed by the transaction ("write-set") are checked against the read-sets and the write-sets of other concurrently executing transactions for conflicts indicating atomicity violations.

In conventional processors, hardware transactional memory may be implemented as follows: a transaction's read-set is recorded in the processor's load buffer, while its write-set is recorded in the processor's store buffer. Whenever a transaction performs a write, a request is initiated that checks the read-set and write-set of other concurrently executing transactions by searching for a match in their load buffer and store buffer respectively. The checking of the transaction's read-set and write-set for a match must be performed in a timely manner. As the size of the read-set and the write-set of the transaction increases in size, the ability to search in a timely manner is compromised.

SUMMARY OF INVENTION

According to one aspect of one or more embodiments of the present invention, a method of read-set and write-set management distinguishes between shared and non-shared memory regions. A shared memory region, used by a transactional memory application, which may be shared by one or more concurrent transactions, is identified. A non-shared memory region, used by the transactional memory application, which is not shared by the one or more concurrent transactions, is identified. A subset of a read-set and a write-set that access the shared memory region is checked for conflicts with the one or more concurrent transactions at a first granularity. A subset of the read-set and the write-set that access the non-shared memory region is checked for conflicts with the one or more concurrent transactions at a second granularity. The first granularity is finer than the second granularity.

According to one aspect of one or more embodiments of the present invention, a method of read-set and write-set management distinguishes between shared and non-shared memory regions. Upon execution of a load instruction as part of a transaction, it is determined whether the load instruction reads from a shared region of memory that may be shared by one or more concurrent transactions by comparing the load address to information provided by a shared-region instruction previously executed as part of the transaction. If the load address is within the shared region of memory, the load address is recorded within a Shared Region Load Address Buffer. If the load address is not within the shared region of memory, the load address is recorded within a Non-Shared Region Load Address Buffer. Upon execution of a store instruction as part of the transaction, it is determined whether the store instruction writes to the shared region of memory by comparing the store address to information provided by the shared-region instruction. If the store address is within the shared region of memory, the store address is recorded within a Shared Region Store Address Buffer. If the store address is not within the shared region of memory, the store address is recorded within a Non-Shared Region Store Address Buffer. The Shared Region Load Address Buffer and the Shared Region Store Address Buffer are checked for conflicts with the one or more concurrent transactions at a first granularity. The Non-Shared Region Load Address Buffer and the Non-Shared Region Store Address Buffer are checked for conflicts with the one or more concurrent transactions at a second granularity. The first granularity is finer than the second granularity.

According to one aspect of one or more embodiments of the present invention, a system includes a PCB, an input device, an output device, a storage device, and a processor. The processor includes one or more cores. Each core includes a Shared Region Load Address Buffer, a Non-Shared Region Load Address Buffer, a Shared Region Store Address Buffer, and a Non-Shared Region Store Address Buffer. The processor's instruction set architecture includes a shared-region instruction. The processor executes instructions that include a transactional memory application. During execution of the transactional memory application, the processor is configured to perform the following: Upon execution of a load instruction as part of a transaction, it is determined whether the load instruction reads from a shared region of memory that may be shared by one or more concurrent transactions by comparing the load address to information provided by a shared-region instruction previously executed as part of the transaction. If the load address is within the shared region of memory, the load address is recorded within a Shared Region Load Address Buffer. If the load address is not within the shared region of memory, the load address is recorded within a Non-Shared Region Load Address Buffer. Upon execution of a store instruction as part of the transaction, it is determined whether the store instruction writes to the shared region of memory by comparing the store address to information provided by the shared-region instruction. If the store address is within the shared region of memory, the store address is recorded within a Shared Region Store Address Buffer. If the store address is not within the shared region of memory, the store address is recorded within a Non-Shared Region Store Address Buffer. The Shared Region Load Address Buffer and the Shared Region Store Address Buffer are checked for conflicts with the one or more concurrent transactions at a first granularity. The Non-Shared Region Load Address Buffer and the Non-Shared Region Store Address Buffer are checked for conflicts with the one or more concurrent transactions at a second granularity. The first granularity is finer than the second granularity.

Other aspects of the present invention will be apparent from the following description and the appended claims.

DETAILED DESCRIPTION

Figure 1:
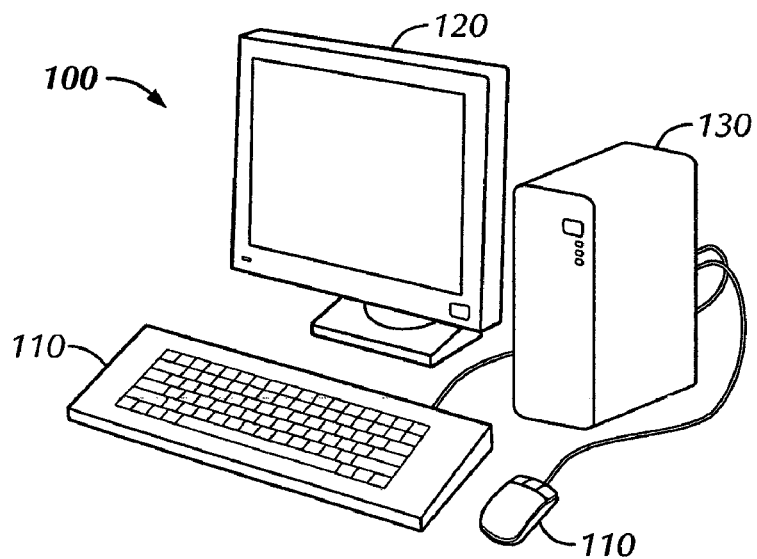
FIG. 1 shows a computing system in accordance with one or more embodiments of the present invention.

Specific embodiments of the present invention will now be described in detail with reference to the accompanying figures. Like elements in the various figures are denoted by like reference numerals for consistency. Further, in the following detailed description of embodiments of the present invention, numerous specific details are set forth in order to provide a more thorough understanding of the present invention. In other instances, well-known features have not been described in detail to avoid obscuring the description of embodiments of the present invention.

FIG. 1 shows a computing system in accordance with one or more embodiments of the present invention. A computing system 100 includes an input device 110, an output device 120, and a mechanical chassis 130. The mechanical chassis 130 includes one or more printed circuit boards ("PCB"), a network device, and a storage device (not shown). In one or more embodiments of the present invention, the computing system 100 is a server, a workstation, a desktop computer, or a mobile computer. One of ordinary skill in the art will recognize the computing system could be any processor-based computing device.

Figure 2:
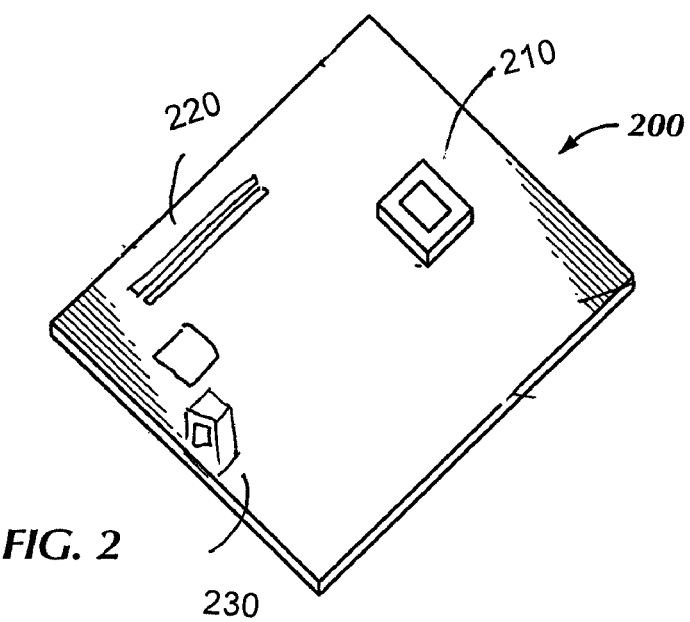
FIG. 2 shows a printed circuit board of the computing system in accordance with one or more embodiments of the present invention.

FIG. 2 shows a printed circuit board of the computing system in accordance with one or more embodiments of the present invention. A PCB 200 includes one or more processors 210, a system memory 220, and a network device 230. In one or more embodiments of the present invention the network device 230 supports the Ethernet standard. One of ordinary skill in the art will recognize that the one or more processors 210, the system memory 220, and the network device 230 may be disposed on any combination of one or more PCBs 200 as part of the computing system 100.

Figure 3:
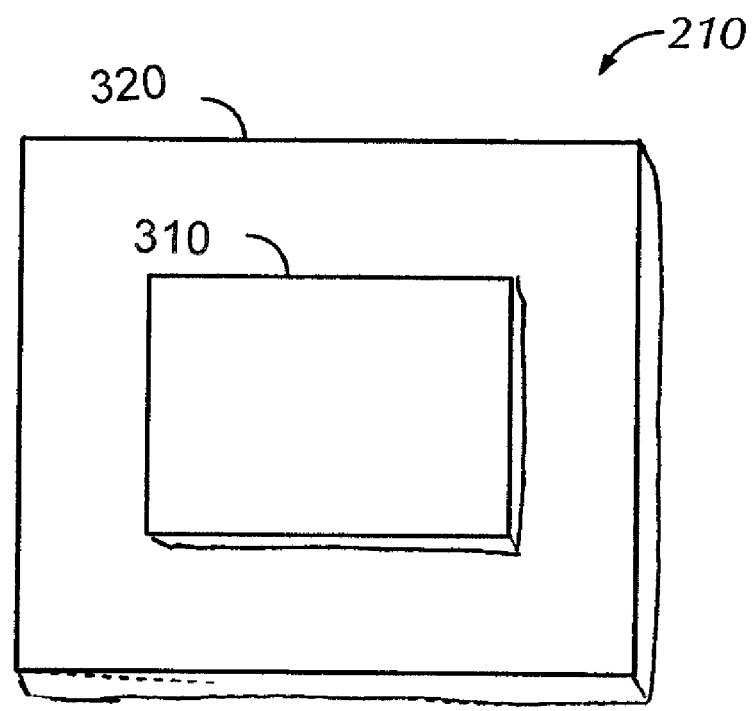
FIG. 3 shows a processor of the computing system in accordance with one or more embodiments of the present invention.

FIG. 3 shows a processor of the computing system in accordance with one or more embodiments of the present invention. Each processor 210 includes one or more die 310 disposed on a substrate 320. Each die 310 includes one or more processing cores 330. Each processing core 330 includes one or more on-chip cache as part of a hierarchical organization of memory within the computing system 100. The on-chip cache may store instructions, data, or a combination of instructions and data. One of ordinary skill in the art will recognize that the use of on-chip cache can accelerate memory operations.

A processor 210 that consists of a single processing core is referred to a single-core processor. A single-core processor includes a private first level cache ("L1$") and a private second level cache ("L2$"). In this instance, the L1$ and L2$ are private because they are for the exclusive use of the single-core processor. The caches are named in order of proximity to the core. In this instance, the cache closest to the core is designated the L1$. If the computing system 100 includes a plurality of single-core processors that share the system memory 220, additional hardware may be implemented within the computing system 100 to ensure coherency of the caches of each single-core processor and the system memory 220. One of ordinary skill in the art will recognize that the cache configuration of a single-core processor may vary in accordance with one or more embodiments of the present invention.

A processor 210 that consists of multiple processing cores is referred to as a multi-core processor. In a multi-core processor, each core includes a private L1$, a private L2$, and a third level cache ("L3$") that is shared by all the processing cores that comprise the multi-core processor. In this instance, the L3$ is considered shared because it is shared by all the cores that comprise the multi-core processor. If the computing system 100 includes a plurality of multi-core processors that share the system memory 220, additional hardware may be implemented within the computing system 100 to ensure coherency of the caches of each processor and the system memory 220. One of ordinary skill in the art will recognize that the cache configuration of a multi-core processor may vary in accordance with one or more embodiments of the present invention.

To support the execution of concurrent transactions, a processor must track the reads and writes performed by a given transaction. The read-set and the write-set of the transaction are checked against the read-sets and the write-sets of other concurrently executing transactions for conflicts. Whenever a transaction performs a read or a write, a request is initiated that checks the read-sets and write-sets of the other concurrently executing transactions by searching for a match.

In one or more embodiments of the present invention, a transactional memory application informs a processor which memory regions are potentially shared by concurrent transactions and which memory regions are never shared by concurrent transactions. With respect to a given transaction, the memory regions that are potentially shared by concurrent transactions are referred to as shared memory regions. The memory regions that are not shared by concurrent transactions are referred to as non-shared memory regions. The portion of the read-set and the write-set that access the shared memory regions are searched at a finer granularity than the portion that accesses the non-shared memory regions. Because a significant proportion of the memory regions used by a transactional memory application are not shared across concurrent transactions, tracking the read and write accesses to non-shared memory regions at a coarser granularity reduces the size and access time of the structures used for this purpose.

Figure 4:
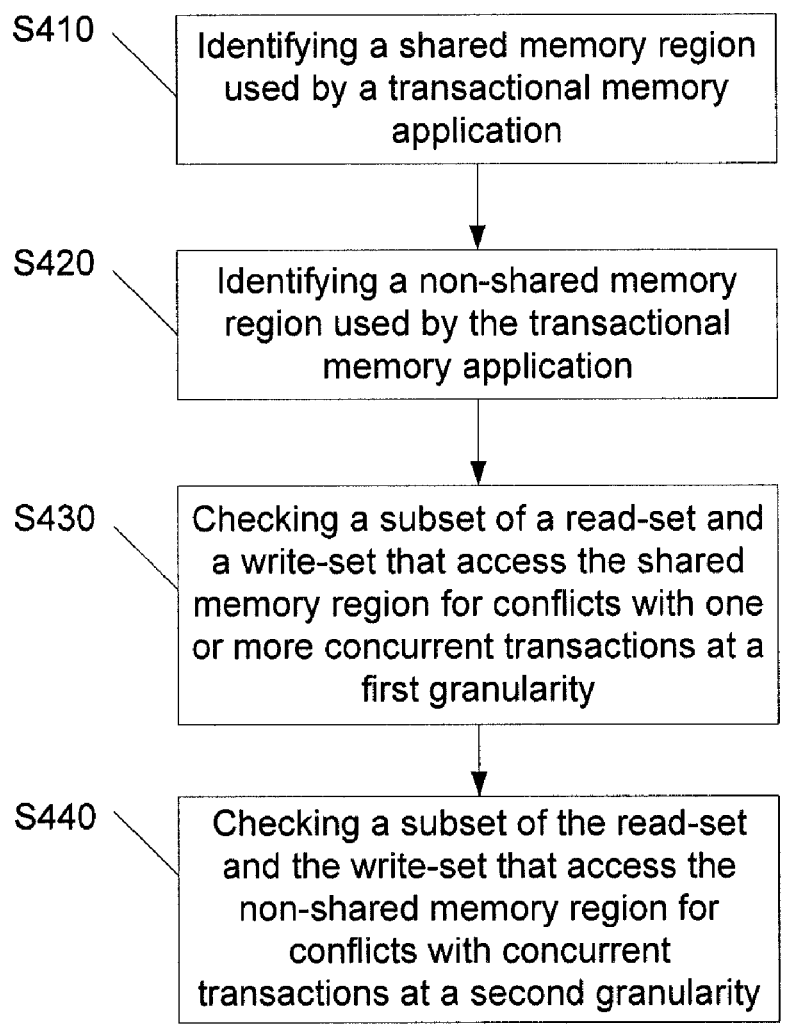
FIG. 4 shows a method of read-set and write-set management by distinguishing between shared and non-shared memory regions in accordance with one or more embodiments of the present invention.

FIG. 4 shows a method of read-set and write-set management by distinguishing between shared and non-shared memory regions in accordance with one or more embodiments of the present invention. In step 410, a processor identifies a shared memory region used by a transactional memory application that may be shared by concurrent transactions. In step 420, the processor identifies a non-shared memory region used by the transactional memory application that is not shared by concurrent transactions. In step 430, the processor checks a subset of a read-set and a write-set that access the shared memory region for conflicts with concurrent transactions at a first granularity. In step 440, the processor checks a subset of the read-set and the write-set that access the non-shared memory region for conflicts with concurrent transactions at a second granularity, wherein the first granularity is finer than the second granularity. In one or more embodiments of the present invention, the first granularity is word granularity and the second granularity is page granularity. One of ordinary skill in the art will recognize that the first and second granularities can vary in accordance with one or more embodiments of the present invention while maintaining the relation whereby the first granularity is finer than the second granularity.

In one or more embodiments of the present invention, a processor includes an instruction set architecture that includes an instruction that allows a transactional memory application to inform the processor which memory regions are used by the transactional memory application and are potentially shared by concurrently executing transactions. In a preferred embodiment, an exemplary instruction, {shared_region operand1, operand2}, includes a first operand, operand1, which specifies the address of the start of the shared memory region and a second operand, operand2, which specifies the size of the shared memory region. Within a transaction, memory regions accessed by the transaction that have not been explicitly marked as potentially shared via the use of the shared_region instruction are deemed to be non-shared memory regions. One of ordinary skill in the art will recognize that the implementation of the new instruction could vary in accordance with one or more embodiments of the present invention. Additionally, the processor includes a Shared Region Load Address Buffer, a Non-Shared Region Load Address Buffer, a Shared Region Store Address Buffer, and a Non-Shared Region Store Address Buffer.

Figure 5:
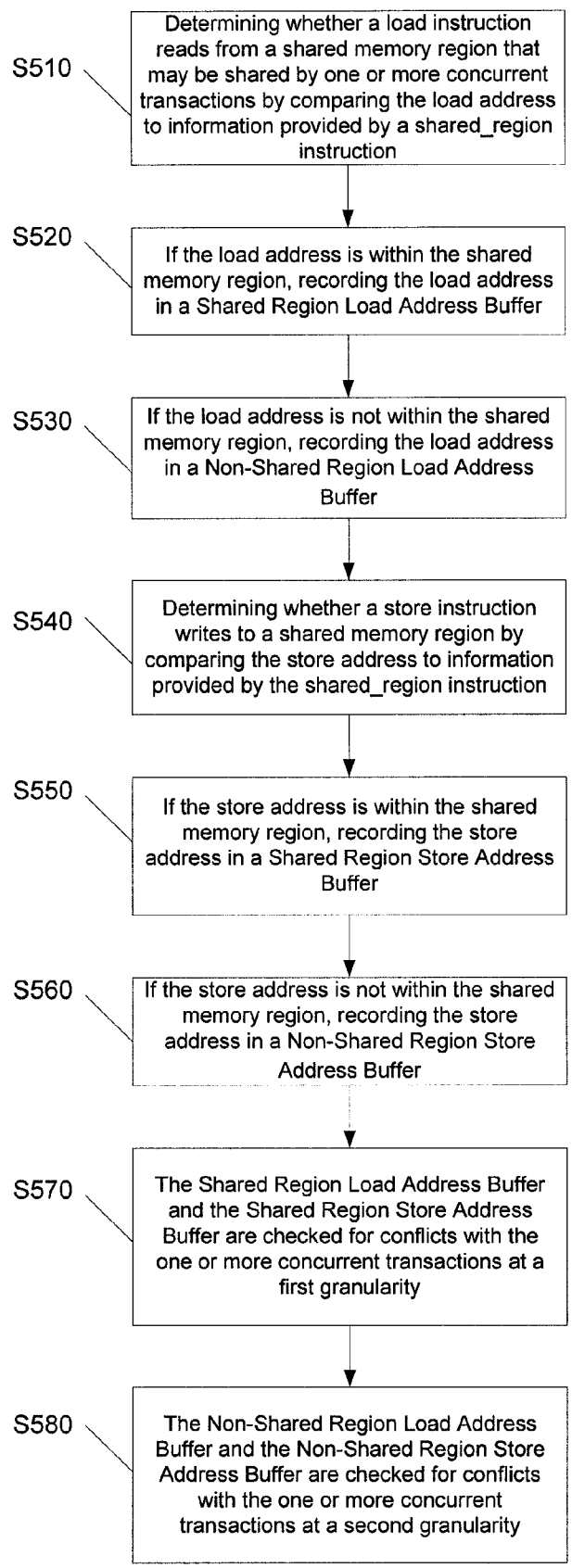
FIG. 5 shows a method of read-set and write-set management by distinguishing between shared and non-shared memory regions in accordance with one or more embodiments of the present invention.

FIG. 5 shows a method of read-set and write-set management by distinguishing between shared and non-shared memory regions in accordance with one or more embodiments of the present invention. Additionally, the system of FIG. 1 implements the method of FIG. 5. A transactional memory application executes, as part of a transaction, a shared_region instruction that informs the processor which memory regions are used by the transactional memory application and are potentially shared by concurrently executing transactions. In step 510, whenever the processor executes a load instruction as part of the transaction, the processor determines whether the load instruction reads from a shared region of memory that may be shared by concurrent transactions by comparing the load address to information provided by the shared-region instruction. In step 520, if the load address is within the shared region of memory, the load address is recorded within a Shared Region Load Address Buffer that tracks addresses at a first granularity. In one or more embodiments of the present invention, the Shared Region Load Address Buffer is a content-addressable memory ("CAM"). In effect, the Shared Region Load Address Buffer records the portion of the transaction's read-set that accesses a memory region that is potentially shared with concurrent transactions. Each entry in the buffer may include a pointer that links the load address in the entry to the corresponding load instruction in the processor's reorder buffer ("ROB").

In step 530, if the load address is not within the shared region of memory, the load address is stored within a Non-Shared Region Load Address Buffer that tracks addresses at a second granularity. In one or more embodiments of the present invention, the Non-Shared Region Load Address Buffer is a CAM or a set-associative memory. In effect, the Non-Shared Region Load Address Buffer records the portion of the transaction's read-set that accesses a memory region that is not shared with concurrent transactions. Because more than one load instruction in the transaction may map to the same entry in the Non-Shared Region Load Address Buffer, each entry may hold several pointers that link the load address in the entry to the corresponding load instruction in the processor's ROB.

Every load instruction in a transaction is allocated an entry in either the Shared Region Load Address buffer or an entry in the Non-Shared Region Load Address Buffer. If a load instruction that maps to a non-shared memory region cannot be allocated an entry in the Non-Shared Region Load Address Buffer because the buffer is full, it can be entered in the Shared Region Load Address Buffer. Likewise, if a load instruction that maps to a shared memory region cannot be allocated an entry in the Shared Region Load Address Buffer because the buffer is full, it can be entered in the Non-Shared Region Load Address Buffer. This is allowable because, whether a load allocates an entry in the Shared Region Load Address Buffer or in the Non-Shared Region Load Address Buffer, correctness will still be preserved. If a load instruction cannot be allocated an entry in either of the two buffers, the transaction fails.

When a transaction performs a load operation, it sends a request that checks the Shared Region Load Address Buffer and the Non-Shared Region Load Address Buffer of all other concurrent transactions. If there is a match in either buffer of another concurrent transaction, either the requesting or the matching transaction fails. Which transaction fails depends on the chosen conflict resolution mechanism. When a transaction eventually commits, the load instructions in the transaction deallocate their entries in the Shared Region Load Address Buffer and the Non-Shared Region Load Address Buffer. Likewise, when a transaction fails, all of its entries in the Shared Region Load Address Buffer and the Non-Shared Region Load Address Buffer are also deallocated.

In step 540, whenever the processor executes a store instruction as part of the transaction, the processor determines whether the store instruction writes to the shared region of memory by comparing the store address to information provided by the shared-region instruction. In step 550, if the store address is within the shared region of memory, the store address is recorded within a Shared Region Store Address Buffer that tracks addresses at a first granularity. In one or more embodiments of the present invention, the Shared Region Store Address Buffer is a CAM. In effect, the Shared Region Store Address Buffer records the portion of the transaction's write-set that accesses a memory region that is potentially shared with concurrent transactions. Each entry in the buffer may include a pointer that links the store address in the entry to the corresponding store instruction in the processor's Store Data Buffer. The Store Data Buffer is a first-in-first-out ("FIFO") structure that holds the store data that will be written at the memory location specified by the store address.

In step 560, if the store address is not within the shared region of memory, the store address is recorded within a Non-Shared Region Store Address Buffer that tracks addresses at a second granularity. In one or more embodiments of the present invention, the Non-Shared Region Store Address Buffer is a CAM or a set-associative memory. In effect, the Non-Shared Region Store Address Buffer records the portion of the transaction's write-set that accesses a memory region that is not shared with concurrent transactions. Because more than one store instruction in the transaction may map to the same entry in the Non-Shared Region Store Address Buffer, each entry may hold several pointers that link the store address in the entry to the corresponding store data in the processor's Store Data Buffer.

Every store instruction in a transaction is allocated an entry in either the Shared Region Store Address buffer or an entry in the Non-Shared Region Store Address Buffer. If a store instruction that maps to a non-shared memory region cannot be allocated an entry in the Non-Shared Region Store Address Buffer because the buffer is full, it can be entered in the Shared Region Store Address Buffer. Likewise, if a store instruction that maps to a shared memory region cannot be allocated an entry in the Shared Region Store Address Buffer because the buffer is full, it can be entered in the Non-Shared Region Store Address Buffer. This is allowable because, whether a store allocates an entry in the Shared Region Store Address Buffer or in the Non-Shared Region Store Address Buffer, correctness will still be preserved. If a store instruction cannot be allocated an entry in either of the two buffers, the transaction fails.

When a transaction performs a store operation, it sends a request that checks the Shared Region Store Address Buffer and the Non-Shared Region Store Address Buffer of all other concurrent transactions. If there is a match in either buffer of another concurrent transaction, either the requesting or the matching transaction fails. Which transaction fails depends on the chosen conflict resolution mechanism. When a transaction eventually commits, the store instructions in the transaction deallocate their entries in the Shared Region Store Address Buffer and the Non-Shared Region Store Address Buffer. Likewise, when a transaction fails, all of its entries in the Shared Region Store Address Buffer and the Non-Shared Region Store Address Buffer are also deallocated.

In step 570, the Shared Region Load Address Buffer and the Shared Region Store Address Buffer are checked for conflicts with concurrent transactions at a first granularity. In step 580, the Non-Shared Region Load Address Buffer and the Non-Shared Region Store Address Buffer are checked for conflicts with concurrent transactions at a second granularity. The first granularity is finer than the second granularity. In one or more embodiments of the present invention, the first granularity is word granularity and the second granularity is page granularity. One of ordinary skill in the art will recognize that the first and second granularities can vary in accordance with one or more embodiments of the present invention while maintaining the relation whereby the first granularity is finer than the second granularity.

In one or more embodiments of the present invention, the read-set and write-set management can be applied to signature-based read-sets and write-sets. For reads and writes to non-shared memory regions, because they can be tracked at coarser granularity, fewer bits of their addresses need to be hashed into the signatures, thereby reducing the size of the signatures and/or reducing the number of false positives. In one or more embodiments of the present invention, the read-set of non-shared memory regions is tracked by one signature and the read-set of shared memory regions is tracked by another signature with different signature generation algorithms. Each signature algorithm is optimized using knowledge of whether the addresses are mapped to the signature for the shared or non-shared memory region. Likewise, the write-set of non-shared memory regions can be tracked by one signature while the write-set of shared memory regions are tracked by another signature.

Advantages of one or more embodiments of the present invention may include one or more of the following.

In one or more embodiments of the present invention, the method of read-set and write-set management by distinguishing between shared and non-shared memory regions provides the ability to track larger read-sets and write-set, thereby enabling larger transactions.

In one or more embodiments of the present invention, the method of read-set and write-set management by distinguishing between shared and non-shared memory regions allows for the reduction in the size of the memory structures utilized to support large transactions.

In one or more embodiments of the present invention, the method of read-set and write-set management by distinguishing between shared and non-shared memory regions provides reduced access time for the memory structures utilized to support large transactions.

In one or more embodiments of the present invention, the method of read-set and write-set management by distinguishing between shared and non-shared memory regions supports larger read-sets and write-sets without degrading processor performance, including degradation because of false-positives.

In one or more embodiments of the present invention, the combination of a Shared Region Load Address Buffer and a Non-Shared Load Address Buffer require less storage and achieve lower access time in comparison to a conventional load buffer.

In one or more embodiments of the present invention, the combination of a Shared Region Store Address Buffer and a Non-Shared Store Address Buffer require less storage and achieve lower access time in comparison to a conventional store buffer.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method of read-set and write-set management by distinguishing between shared and non-shared memory regions comprising:
   identifying a shared memory region used by a transactional memory application which may be shared by one or more concurrent transactions;
   identifying a non-shared memory region used by the transactional memory application which is not shared by the one or more concurrent transactions;
   checking a subset of a read-set and a write-set that access the shared memory region for conflicts with the one or more concurrent transactions at a first granularity;
   checking a subset of the read-set and the write-set that access the non-shared memory region for conflicts with the one or more concurrent transactions at a second granularity,
   wherein the first granularity is finer than the second granularity.

2. The method of claim 1, wherein the first granularity is word granularity and the second granularity is page granularity.

3. A method of read-set and write-set management by distinguishing between shared and non-shared memory regions comprising:
   determining, upon execution of a load instruction as part of a transaction, whether the load instruction reads from a shared region of memory that may be shared by one or more concurrent transactions by comparing the load address to information provided by a shared-region instruction previously executed as part of the transaction;
   recording, if the load address is within the shared region of memory, the load address within a Shared Region Load Address Buffer;
   recording, if the load address is not within the shared region of memory, the load address within a Non-Shared Region Load Address Buffer;
   determining, upon execution of a store instruction as part of the transaction, whether the store instruction writes to the shared region of memory by comparing the store address to information provided by the shared-region instruction;
   recording, if the store address is within the shared region of memory, the store address within a Shared Region Store Address Buffer;
   recording, if the store address is not within the shared region of memory, the store address within a Non-Shared Region Store Address Buffer;

wherein the Shared Region Load Address Buffer and the Shared Region Store Address Buffer are checked for conflicts with the one or more concurrent transactions at a first granularity, wherein the Non-Shared Region Load Address Buffer and the Non-Shared Region Store Address Buffer are checked for conflicts with the one or more concurrent transactions at a second granularity, and wherein the first granularity is finer than the second granularity.

4. The method of claim 3, wherein the shared-region instruction specifies a start address of the shared memory region and a size of the shared memory region.

5. The method of claim 3, wherein the first granularity is word granularity and the second granularity is page granularity.

6. The method of claim 3, wherein the Shared Region Load Address Buffer is a content addressable memory.

7. The method of claim 3, wherein the Non-Shared Region Load Address Buffer is a content addressable memory.

8. The method of claim 3, wherein the Non-Shared Region Load Address Buffer is a set associative memory.

9. The method of claim 3, wherein the Shared Region Store Address Buffer is a content addressable memory.

10. The method of claim 3, wherein the Non-Shared Region Store Address Buffer is a content addressable memory.

11. The method of claim 3, wherein the Non-Shared Region Store Address Buffer is a set associative memory.

12. The method of claim 3, wherein the read-set of the shared memory region is tracked by a shared signature and the read-set of the non-shared memory region is tracked by a non-shared signature.

13. The method of claim 12, wherein the shared signature is different from the non-shared signature.

14. The method of claim 13, wherein the shared signature and the non-shared signature are optimized based on the knowledge of whether they refer to shared or non-shared memory regions.

15. A system comprising:
a PCB;
an input device;
an output device;
a storage device; and
a processor comprising one or more cores, each core comprising:
  a Shared Region Load Address Buffer,
  a Non-Shared Region Load Address Buffer,
  a Shared Region Store Address Buffer, and
  a Non-Shared Region Store Address Buffer,
wherein the processor's instruction set architecture includes a shared-region instruction,
wherein the processor executes instructions comprising a transactional memory application,
wherein, during execution of the transactional memory application, the processor is configured to perform the following:
  determining, upon execution of a load instruction as part of a transaction, whether the load instruction reads from a shared region of memory that may be shared by one or more concurrent transactions by comparing the load address to information provided by a shared-region instruction previously executed as part of the transaction,
  recording, if the load address is within the shared region of memory, the load address within a Shared Region Load Address Buffer,
  recording, if the load address is not within the shared region of memory, the load address within a Non-Shared Region Load Address Buffer,
  determining, upon execution of a store instruction as part of the transaction, whether the store instruction writes to the shared region of memory by comparing the store address to information provided by the shared-region instruction,
  recording, if the store address is within the shared region of memory, the store address within a Shared Region Store Address Buffer,
  recording, if the store address is not within the shared region of memory, the store address within a Non-Shared Region Store Address Buffer,
  wherein the Shared Region Load Address Buffer and the shared region store address buffer are checked for conflicts with the one or more concurrent transactions at a first granularity,
  wherein the Non-Shared Region Load Address Buffer and the non-shared region store address buffer are checked for conflicts with the one or more concurrent transactions at a second granularity, and
  wherein the first granularity is finer than the second granularity.

16. The system of claim 15, wherein the shared-region instruction specifies a start address of the shared memory region and a size of the shared memory region.

17. The system of claim 15, wherein the first granularity is word granularity and the second granularity is page granularity.

18. The system of claim 15, wherein the Shared Region Load Address Buffer is a content addressable memory.

19. The system of claim 15, wherein the Non-Shared Region Load Address Buffer is a content addressable memory.

20. The system of claim 15, wherein the Non-Shared Region Load Address Buffer is a set associative memory.

21. The system of claim 15, wherein the Shared Region Store Address Buffer is a content addressable memory.

22. The system of claim 15, wherein the Non-Shared Region Store Address Buffer is a content addressable memory.

23. The system of claim 15, wherein the Non-Shared Region Store Address Buffer is a set associative memory.

* * * * *